US008233161B2

(12) United States Patent
Saito

(10) Patent No.: US 8,233,161 B2
(45) Date of Patent: Jul. 31, 2012

(54) IMAGE READING AND RECORDING APPARATUS

(75) Inventor: Hiroyuki Saito, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1365 days.

(21) Appl. No.: 11/833,008

(22) Filed: Aug. 2, 2007

(65) Prior Publication Data

US 2008/0062448 A1 Mar. 13, 2008

(30) Foreign Application Priority Data

Aug. 23, 2006 (JP) ................................ 2006-226120

(51) Int. Cl.
*G06F 15/00* (2006.01)
*G06K 1/00* (2006.01)

(52) U.S. Cl. ...................................... 358/1.13; 358/1.1

(58) Field of Classification Search .................. 358/1.1, 358/1.9, 1.11, 1.12, 1.13, 1.14, 1.15, 1.16, 358/1.17, 1.18
See application file for complete search history.

(56) References Cited

U.S. PATENT DOCUMENTS 4,814,817 A * 3/1989 Nishijima et al. ............ 399/125
6,510,301 B2 * 1/2003 Tanaka .......................... 399/125
7,302,221 B2 * 11/2007 Shyu ............................ 399/367
2006/0222435 A1 * 10/2006 Ha et al. ....................... 400/691
2007/0052151 A1 * 3/2007 Asaba ....................... 271/10.01

FOREIGN PATENT DOCUMENTS

JP 63-231459 9/1988
JP 2001-242563 9/2001
JP 2001-320526 11/2001
JP 2004-235831 8/2004

* cited by examiner

*Primary Examiner* — Thierry Pham
(74) *Attorney, Agent, or Firm* — Fitzpatrick Cella Harper & Scinto

(57) ABSTRACT

An image reading and recording apparatus which can prevent a reading unit from unexpectedly being opened even when an operation of a reducing unit such as a damper for reducing an opening/closing force of the reading unit is added to an interlocking motion caused by a force adapted to open a pressure plate portion is provided. The apparatus has: a recording unit which records images onto a recording medium; and a reading unit which is openably and closably arranged for the recording unit and has an original plate on which an original document is put and a pressure plate portion which presses the original onto the original plate. A restricting unit which can restrict the reading unit to the closed state is provided. In the closed state of the pressure plate portion, the restricting unit is made inoperative. In the open state of the pressure plate portion, the restricting unit is made operative.

3 Claims, 16 Drawing Sheets

IMAGE READING AND RECORDING APPARATUS

BACKGROUND OF THE INVENTION

1. Field of the Invention

The present invention relates to an image reading and recording apparatus having: a recording unit for recording an image onto a recording medium based on image information; and a reading unit openably and openably and closably attached to the recording unit.

2. Description of the Related Art

In recent years, an image reading and recording apparatus in which a recording unit for recording based on image information and a reading unit for reading an original document are integratedly assembled has been used. Such an image reading and recording apparatus has a high usability in terms of a point that a monochromatic and color images can be easily copied and a point that an image read by the reading unit can be transmitted to a personal computer and stored and, further, edited. In recent years, there has also been used an apparatus of such a type that a card-shaped recording media connector to which various card-shaped recording media can be connected is provided and images recorded in the card-shaped recording media can be directly output as recording images without passing through the personal computer. Further, there has also been manufactured an apparatus having a very high usability of such a type that by connecting a digital camera, images recorded by the digital camera can be directly output as recording images.

In the image reading and recording apparatus, an apparatus of a multi-function type having a function of an image reading apparatus such as a scanner or the like and a function of a recording apparatus such as an ink-jet recording apparatus or the like can be obtained at a low price and has been widespread. In such a field, for example, a form in which a scanner of a flat bed type has been put on the recording apparatus such as an ink-jet printer as disclosed in Japanese Patent Application Laid-Open No. 2004-235831 is a main stream. Such a form uses a construction in which a reading unit (scanner unit) having a wide area which can read the original of the A4 or LTR size has been arranged over the recording unit. Therefore, various measures have been taken in order to easily execute an operation to supply ink of the recording unit and an operation to recover a paper jam or to easily perform other maintenance operations.

As such a kind of image reading and recording apparatus, a form having the recording unit and the reading unit openably and closably attached to the recording unit is used. The reading unit is constructed by a reading device such as a CCD or the like for reading an image of an original document. FIGS. 15 to 18 are side elevational views illustrating a state where the image reading and recording apparatus having such a form is used. FIG. 15 illustrates the state where the reading unit is closed. FIG. 16 illustrates the state where the reading unit is opened from the state of FIG. 15. FIG. 17 illustrates the state where a pressure plate portion is opened from the state of FIG. 15. FIG. 18 illustrates the state where both of the reading unit and the pressure plate portion are opened. In FIGS. 15 to 18, a reading unit 1002 is arranged like a cover shape over a recording unit 1003. The reading unit (scanner unit) 1002 is openably and closably attached to the recording unit through hinges 1002*a*. In the state of FIG. 16 where the reading unit is opened, the apparatus is in a state where the user can access the inside of the recording unit 1003. That is, in this state, the user can confirm the inside of the recording unit or can exchange a recording head, an ink tank, or the like.

That is, when a detecting unit detects that the reading unit 1002 is open, a carriage in which the recording head and the ink tanks have been mounted is moved to an exchange position of a center portion of the apparatus in order to exchange the ink tank of the recording unit 1003. In this case, since a total weight of the reading unit 1002 and a pressure plate portion 1006 is large, a damper unit 1007 for reducing an opening/closing force of the reading unit or supporting the reading unit when the user opens the reading unit and is working is provided. The damper unit 1007 has such a structure that a spring 10071 is attached between two members which can slide in the axial direction. The damper unit 1007 is compressed in the state where the reading unit is closed as illustrated in FIG. 15. The damper unit 1007 is stretched in the state where the reading unit is opened as illustrated in FIG. 16.

However, in the conventional image reading and recording apparatus, the following problems still remain. As a first problem, as illustrated in FIG. 17, when the pressure plate portion 1006 for pressing the original onto an original plate of the reading unit 1002 is opened, an operation of interlocking motion by an opening force when the pressure plate portion is opened is caused. There is such an inconvenience that an operation of the damper unit 1007 for reducing the opening/closing force of the reading unit 1002 is added to such an operation of interlocking motion, so that the reading unit is also unexpectedly opened as illustrated in FIG. 18. As a second problem, since the reading unit is also opened by the interlocking motion, there is such an inconvenience that the carriage in which the recording head and the ink tanks of the recording unit have been mounted is unexpectedly moved to the accessible exchange position.

SUMMARY OF THE INVENTION

It is an object of the invention to provide an image reading and recording apparatus in which even in the case where an operation of a reducing unit such as a damper or the like for reducing an opening/closing force of a reading unit is added to an interlocking operation by an opening force when a pressure plate portion is opened, it is possible to prevent the reading unit from being opened for a recording unit.

Another object of the invention to provide an image reading and recording apparatus comprising: a recording unit which records an image onto a recording medium; a reading unit which is openably and closably arranged for the recording unit and has an original plate on which an original (or an original document) is put and a pressure plate portion which presses the original onto the original plate; and a restricting unit which restricts that the reading unit is opened for the recording unit when the pressure plate portion is opened for the original plate.

Further another object of the invention to provide an image reading and recording apparatus comprising: a recording unit which records an image onto a recording medium; a reading unit which is openably and closably arranged for the recording unit and has an original plate on which an original document is put and a pressure plate portion which presses the original onto the original plate; an engaging unit which is come into engagement with the recording unit in a state where the reading unit is closed; and a restricting unit which restricts the state where the reading unit has been closed for the recording unit by the engaging unit when the pressure plate portion is opened for the original plate.

Further features of the present invention will become apparent from the following description of exemplary embodiments with reference to the attached drawings.

BRIEF DESCRIPTION OF THE DRAWINGS

FIG. 9A is a schematic front cross sectional view. FIG. 9B is a schematic side sectional view taken along the line 9B-9B in FIG. 9A.

FIG. 10A is a schematic front cross sectional view. FIG. 10B is a schematic side sectional view taken along the line 10B-10B in FIG. 10A.

FIG. 11A is a schematic front cross sectional view. FIG. 11B is a schematic side sectional view taken along the line 11B-11B in FIG. 11A.

FIG. 12A is a schematic front cross sectional view. FIG. 12B is a schematic side sectional view taken along the line 12B-12B in FIG. 12A.

FIG. 13A is a schematic front cross sectional view. FIG. 13B is a schematic side sectional view taken along the line 13B-13B in FIG. 13A.

FIG. 14A is a schematic front cross sectional view. FIG. 14B is a schematic side sectional view taken along the line 14B-14B in FIG. 14A.

DESCRIPTION OF THE PREFERRED EMBODIMENTS

Figure 1:
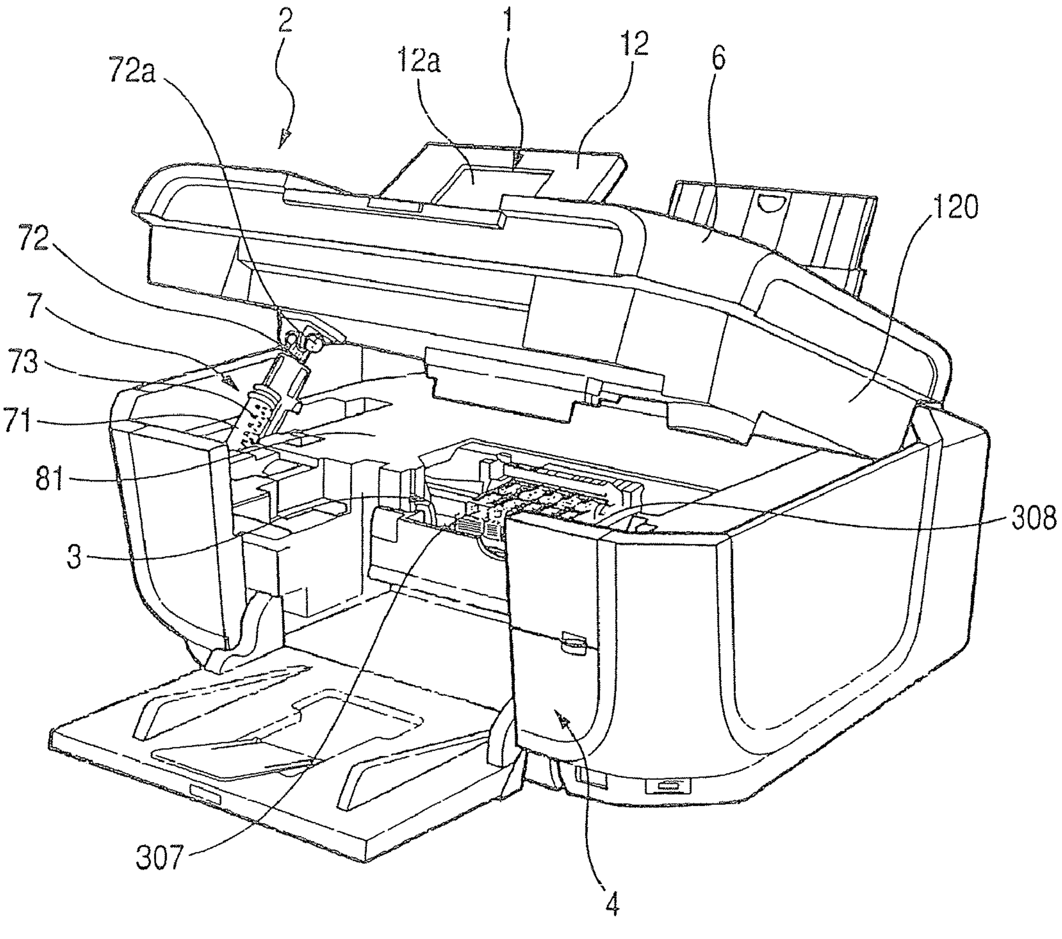
FIG. 1 is a perspective view illustrating a state where a reading unit is opened in an embodiment of an image reading and recording apparatus according to the invention.

An embodiment of the invention will be specifically described hereinbelow with reference to the drawings. The same or corresponding portions in the diagrams are designated by the same reference numerals. A reference numeral added with an alphabet indicates a lower portion constructing a portion designated only by the reference numeral without an alphabet.

First Embodiment

Figure 2:
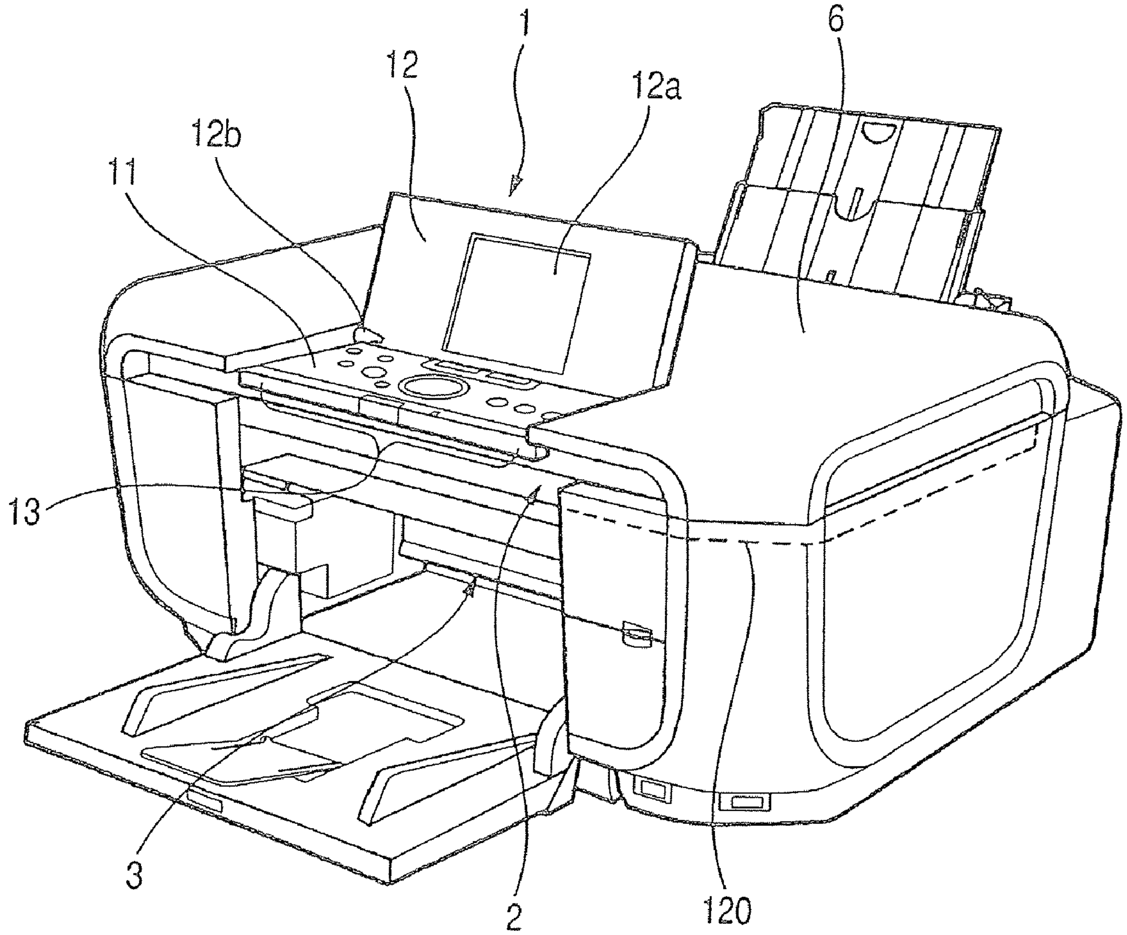
FIG. 2 is a perspective view illustrating a state where the reading unit is closed.
Figure 3:
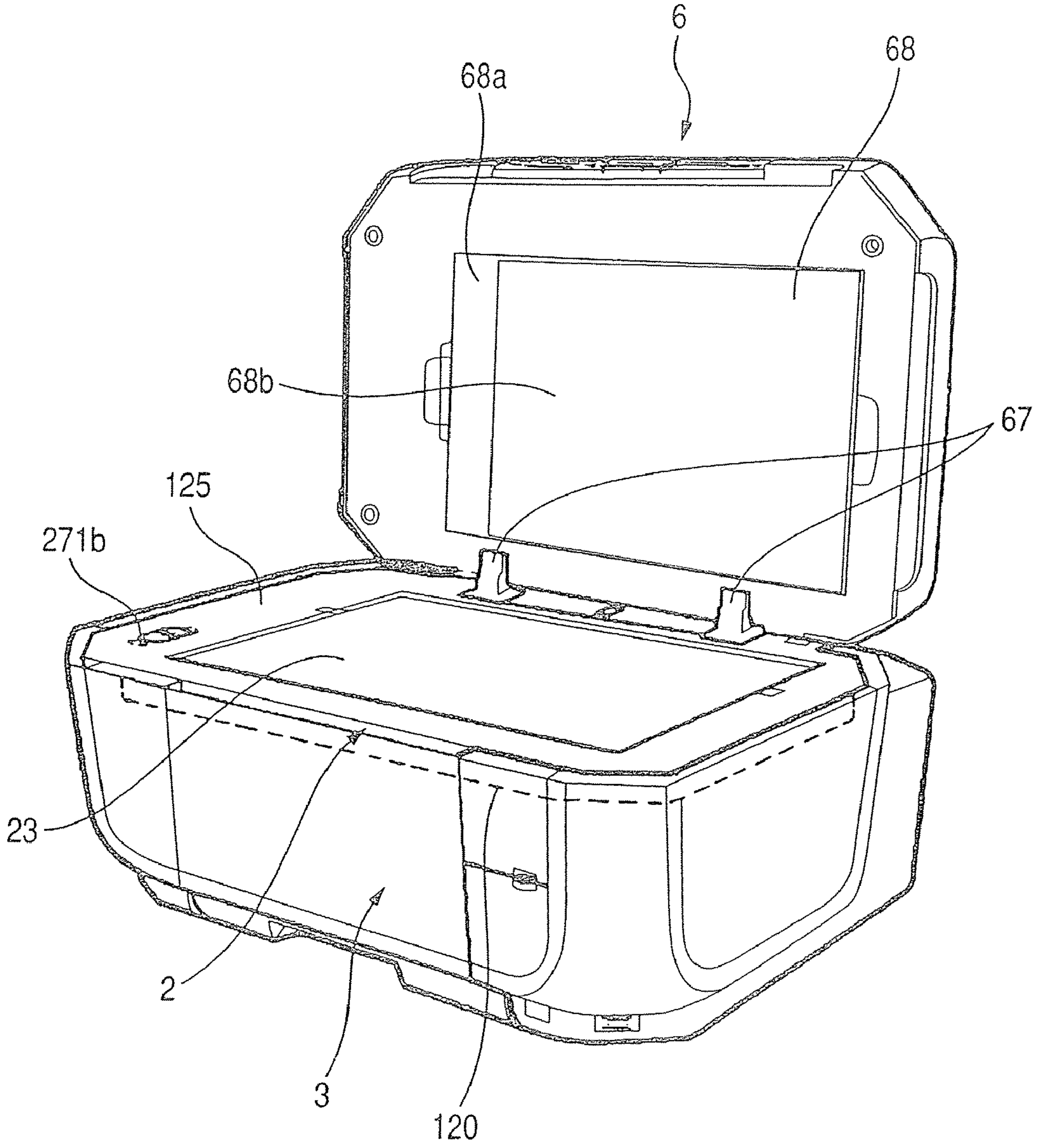
FIG. 3 is a perspective view illustrating a state where a pressure plate portion is opened.
Figure 4:
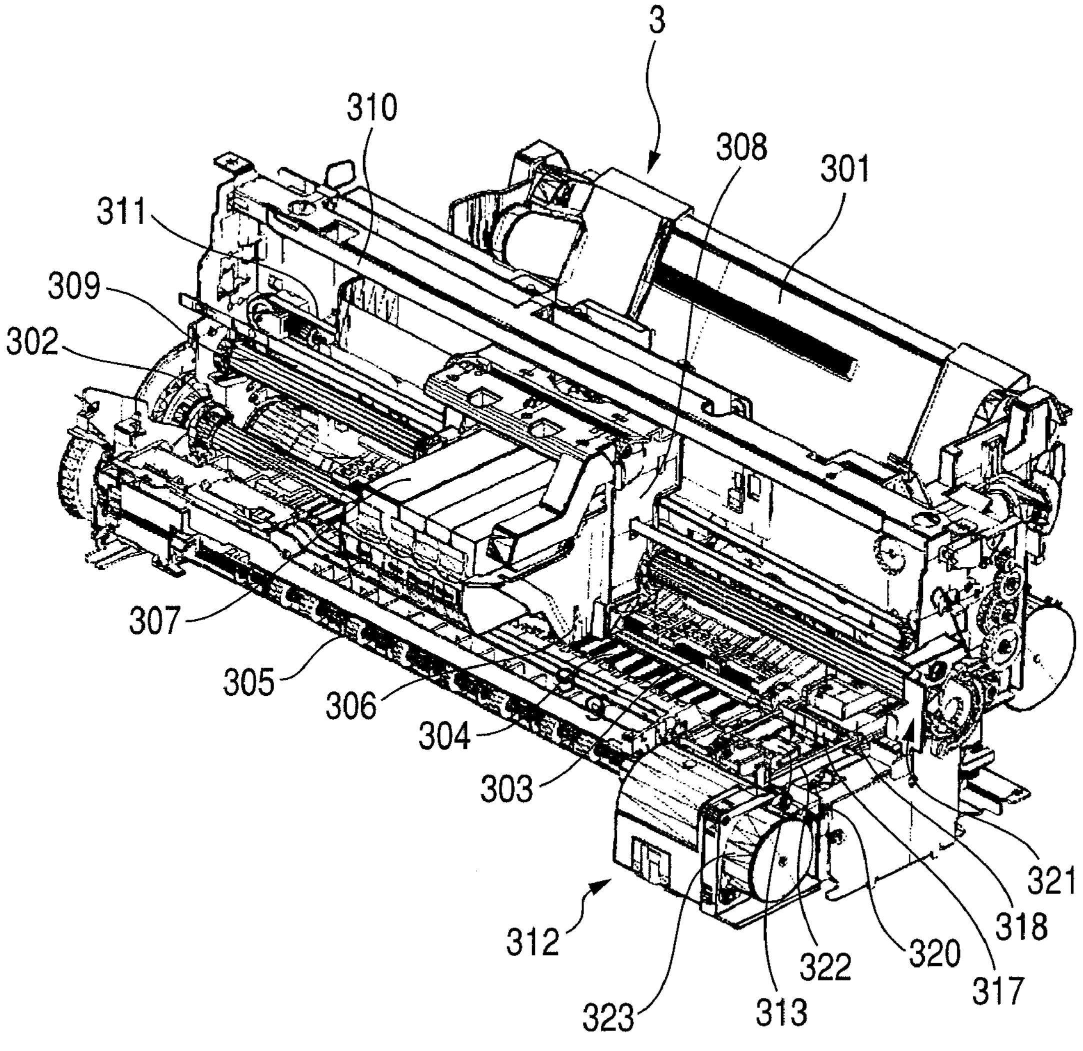
FIG. 4 is a perspective view illustrating an internal structure of a recording unit.
Figure 5:
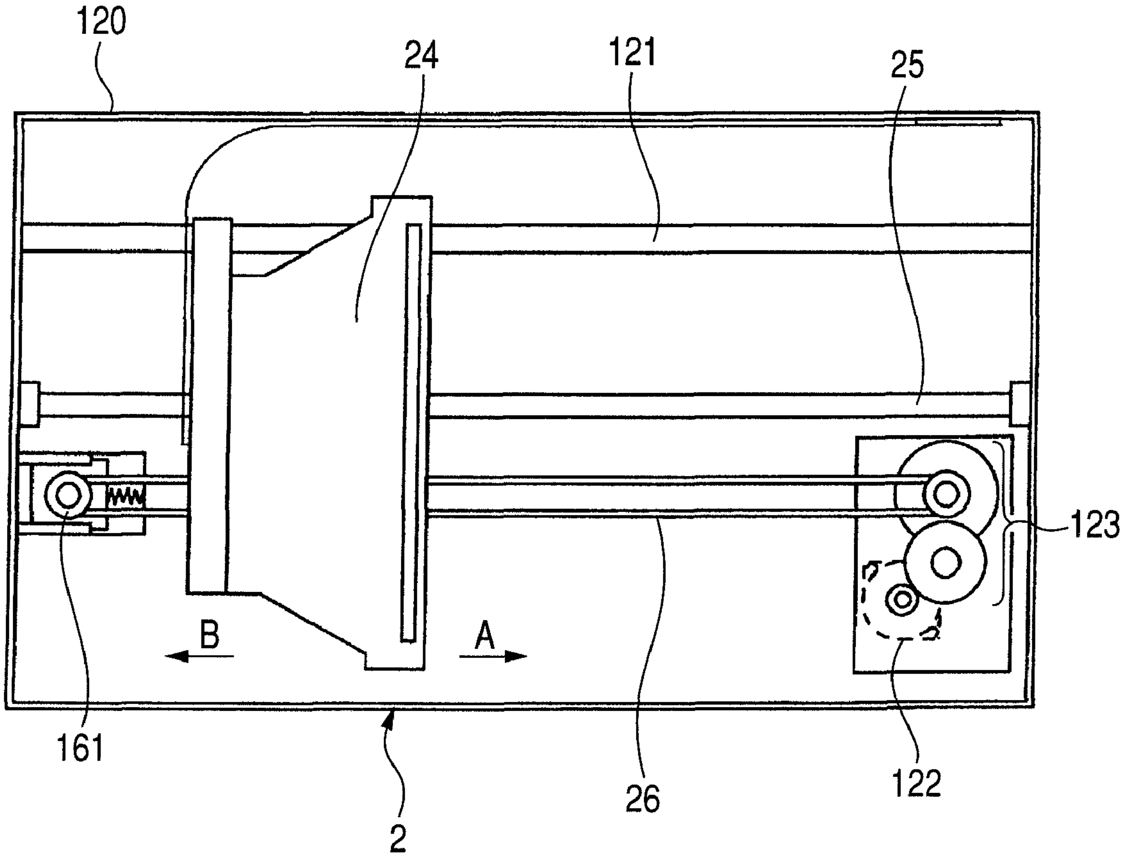
FIG. 5 is a plan view illustrating a state where an original plate and a top cover are removed in the reading unit.
Figure 6:
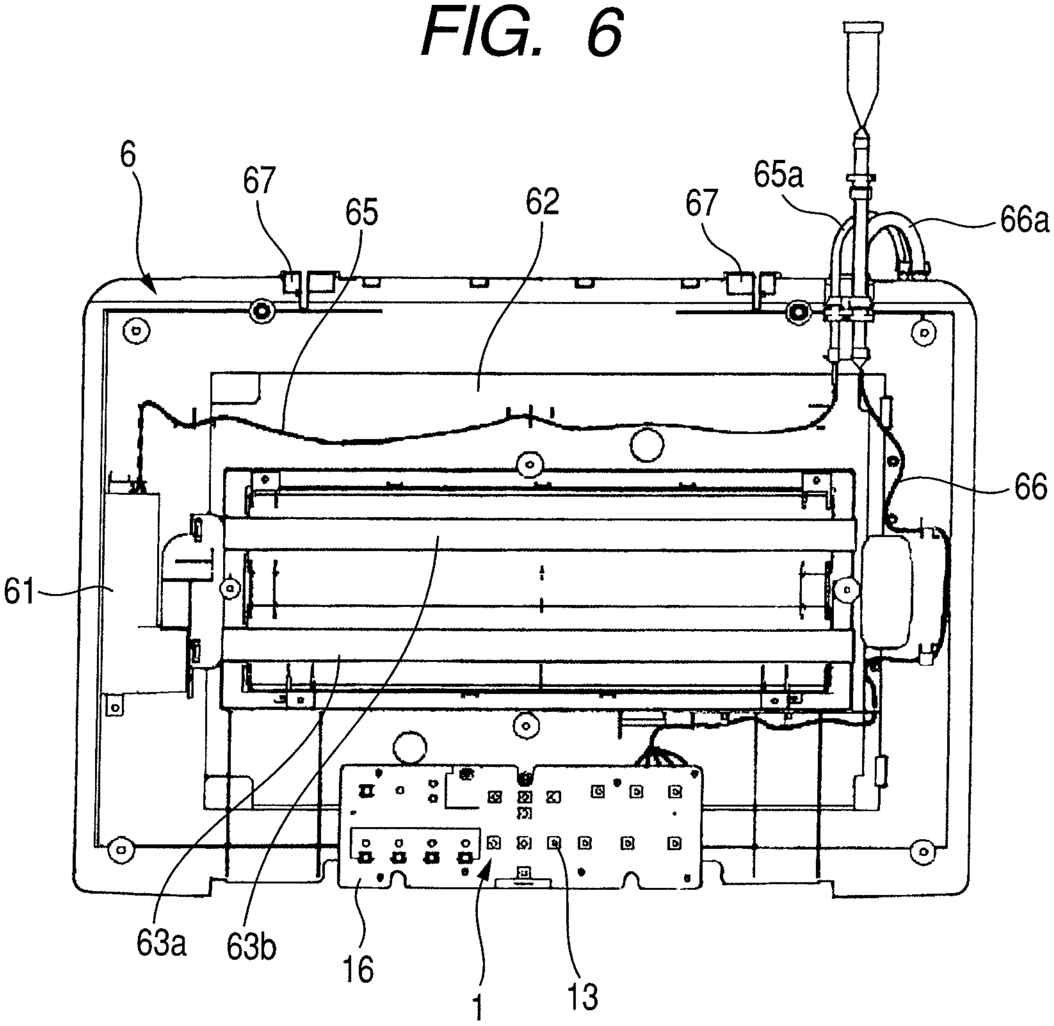
FIG. 6 is a plan view illustrating a state where the top cover and a panel cover are removed in the pressure plate portion.

FIG. 1 is a perspective view illustrating a state where a reading unit is opened in an embodiment of an image reading and recording apparatus according to the invention. FIG. 2 is a perspective view illustrating a state where the reading unit is closed. FIG. 3 is a perspective view illustrating a state where a pressure plate portion is opened. FIG. 4 is a perspective view illustrating an internal structure of a recording unit. FIG. 5 is a plan view illustrating a state where an original plate and a top cover are removed in the reading unit. FIG. 6 is a plan view illustrating a state where the top cover and a panel cover are removed in the pressure plate portion.

In FIGS. 2 and 3, the image reading and recording apparatus has: a panel portion 1; a reading unit (scanner unit) 2; a recording unit 3; a card slot portion 4; a pressure plate portion 6; and an electric circuit board portion (not shown). The recording unit 3 records an image onto a recording medium by a recording head based on image information. The reading unit 2 to read an image on an original document has openably and closably been attached over the recording unit 3 through a middle frame 81. The reading unit 2 has: an original plate on which the original is put; and a pressure plate portion which is openably and closably attached to the original plate and is used to press the original onto the original plate. The panel portion 1 has: an operation panel 11 to operate the image reading and recording apparatus; and an openable and closable LCD unit 12. As recording media which are used in the recording unit 3, various materials such as paper, plastic sheet, photographic sheet, cloth, nonwoven fabric cloth, and the like can be used so long as images can be recorded thereon. This is true of a material of the original whose image is to be read by the reading unit 2. As a concept of the images in the present invention, all images such as characters, symbols, and the like which can be output are incorporated.

First, the panel portion 1 will be described. In FIG. 2, the panel portion 1 is attached to the pressure plate portion 6 of the reading unit 2. The openable and closable LCD unit 12 is provided for the panel portion. Various operation keys (tact switch 13 and the like), an indication lamp, and the like are provided for the operation panel 11 of the panel portion 1. As operation keys, for example, there are a color copy start key, a monochromatic copy start key, a stop key, a power key, and the like. As illustrated in FIG. 6, those operation keys 13 are assembled in the operation panel 11 so that they can be operated from the upper surface of the apparatus. A panel board 16 as illustrated in FIG. 6 is provided on the back surface of the operation panel 11. The tact switch of the operation keys 13 is fixed to the panel board 16 by soldering or the like. An LCD module and an electric circuit board (not shown) are built in the LCD unit 12. An LCD window 12*a* made of a transparent material is provided for the surface of the LCD unit 12. The LCD unit 12 is attached to the operation panel 11 so as to be rotatable (openable and closable) around hinges 12*b* as a center. The user can operate the LCD unit 12.

Figure 7:
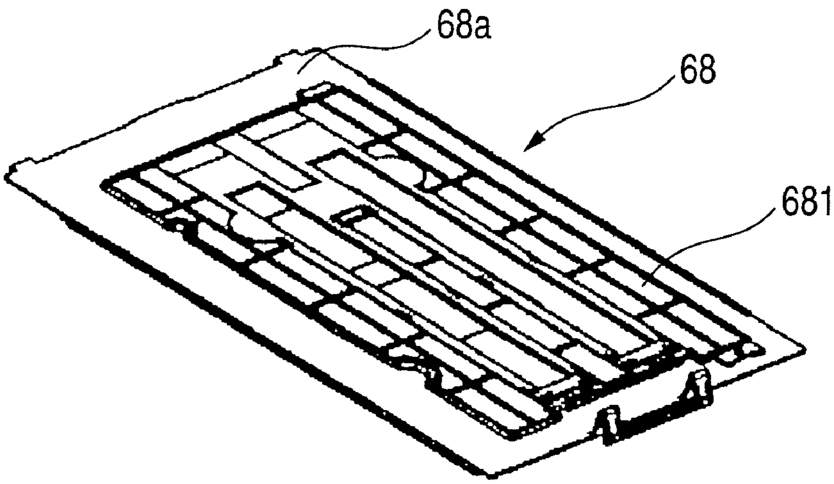
FIG. 7 is a perspective view of a sponge frame unit of the pressure plate portion.
Figure 8:
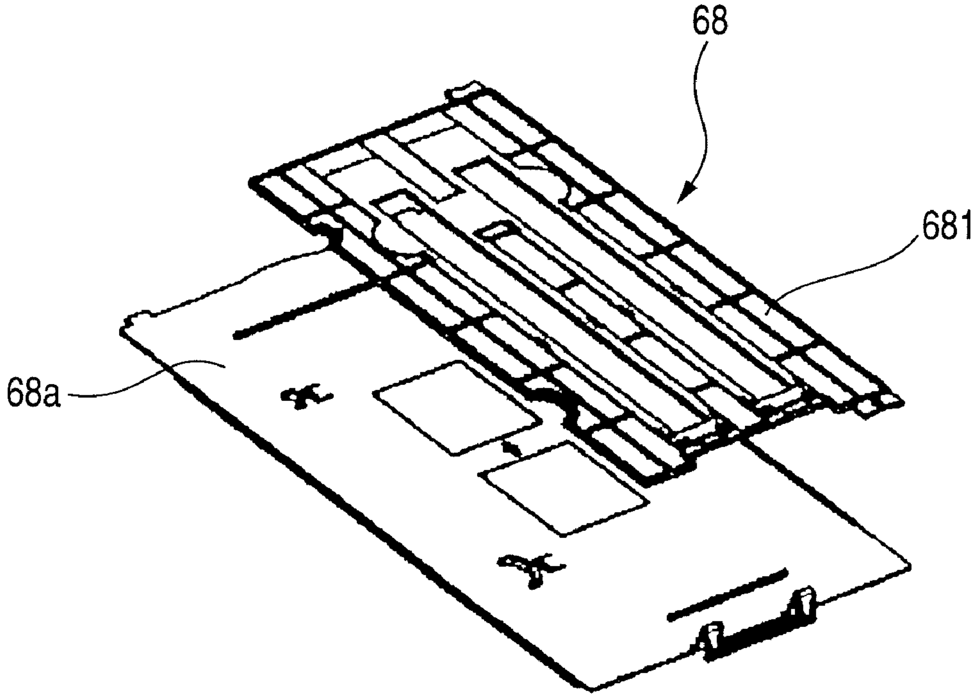
FIG. 8 is a perspective view illustrating a state where a film guide is removed in the sponge frame unit.

The reading unit 2 will now be described. In FIG. 3, a glass plate 23 serving as an original plate for mounting the reading original is provided on the upper surface of the reading unit 2. The original is set onto the glass plate 23 so that the back surface faces up (face-down state). The glass plate 23 is pressed from the upward and assembled onto a frame 120 (FIGS. 3 and 5) of the reading unit 2 by a cover 125. The pressure plate portion 6 for suppressing floating of the original put on the glass plate 23 is openably and closably (rotatably) attached to the upper portion of the reading unit 2. A sponge frame unit 68 is attached to the pressure plate portion 6. FIG. 7 is a perspective view of the sponge frame unit 68 of the pressure plate portion 6. FIG. 8 is a perspective view illustrating a state where a film guide is removed in the sponge frame unit.

The sponge frame unit 68 has a sponge frame 68*a* to which a pressure plate white sheet having a sponge and a white sheet has been attached. The pressure plate white sheet functions as a pressing sheet to read the reflection original. A film guide 681 is enclosed in the sponge frame unit 68 (FIG. 7). The film guide 681 can be removed from the sponge frame 68*a*. The removed film guide 681 can be set onto the glass plate 23. A negative film is set to the film guide 681 set onto the glass plate 23 and an image of the negative film is read. The pressure plate portion 6 to which the panel portion 1, the sponge frame unit 68, and the like have been assembled is attached to one end portion of the cover 125 of the reading unit 2 so as to be openable and closable (rotatable) through hinges 67.

In FIG. 6, fluorescent lamps 63*a* and 63*b* as a light source for reading the transparent original such as a negative film are attached to the pressure plate portion 6. An inverter 61, a reflecting plate 62, a diffusing plate (not shown), and the like are attached to the pressure plate portion 6. When the fluorescent lamps 63*a* and 63*b* are lit on, an image of the film put on the glass plate 23 of the original plate can be read out. When the film is read, the sponge frame 68*a* is removed and the film guide 681 is used. As illustrated in FIG. 6, the panel portion 1 is arranged in an apparatus front portion of the reflecting plate 62 so as to be enclosed within a range of a height of reflecting plate 62. Their wirings are individually arranged like an inverter wire 65 to the inverter 61 and a panel wire 66 to the panel portion 1, respectively, and are led out to the outside of the pressure plate portion 6. The led-out wirings are respectively formed by coating wires 65*a* and 66*a* and again guided from another hole portion(s) of the apparatus into the apparatus. The foregoing pressure plate portion 6 is attached to the reading unit 2 so as to be rotatable and vertically movable by the pressure plate hinges 67. The vertical movement of the pressure plate portion 6 is allowed so as to cope with the thick book original. The pressure plate portion 6 is vertically slidable along an attaching hole of the reading unit 2 side.

In FIG. 5, a reading unit 24 such as a CCD of the reading unit 2 or the like is guided and supported so that it can be scanned and moved between a left edge position to a right edge position as illustrated in the diagram. Parts constructing the reading unit 2 are attached to the frame 120. The reading unit 24 for reading the original image is guided and supported so that it can be reciprocated along a guide axis 25 and a guide rail 121. The reading unit 24 uses a driving motor 122 as a driving source. A driving force decelerated by a gear train 123 is transferred to the reading unit 24 through a timing belt 26, so that the reading unit 24 is driven. The timing belt 26 is suspended around an idler pulley 161 which has been urged by a spring and attached at a position on the opposite side of the gear train 123, so that a predetermined tension is applied to the timing belt 26. When the copying operation is executed or when the scanning operation is executed by a command from a PC, the reading unit 24 is moved in the direction shown by an arrow A. Synchronously with it, the original image is read by the reading unit 24 through the glass plate 23.

The recording unit 3 will now be described. In FIG. 4, a sheet feeding unit 301 for separating and feeding the stacked recording media one by one is provided in a rear portion of the apparatus. The recording medium fed from the sheet feeding unit 301 is sandwiched in a nip portion formed by a conveying roller 302 and a pinch roller 303. By driving the conveying roller 302, the recording medium is conveyed to an image forming unit. The image forming unit has: a platen 304 for guiding the recording medium which is conveyed; and a recording head 306 mounted to a carriage 308 which is reciprocated at a position where it faces the platen. Together with the recording head 306, an exchangeable ink tank 307 is mounted to the carriage 308. The carriage 308 is guided and supported so that it can be reciprocated along a guide shaft 309 and a guide rail 310. The carriage 308 is driven by a carriage motor through a driving belt 311. In the image forming unit, by driving the recording head 306 based on the image information synchronously with the movement (main scan) of the carriage 308, the recording of one line to the recording medium is executed. By alternately repeating the recording of one line and the sheet feeding operation which is executed by the conveying roller 302, the recording of the whole recording medium is executed. The recorded medium is ejected to the outside of the apparatus main body through a discharge roller 305 which is driven synchronously with the conveying roller 302 and a spur (not shown) which is come into pressure contact with the discharge roller 305.

A recovery mechanism portion 312 for maintaining and recovering ink discharging performance of the recording head 306 is arranged at a position (right edge portion in the example illustrated in the diagram) out of a recording area in a moving range of the carriage 308. The recovery mechanism portion 312 has: a cap 313 which is closely adhered to a discharging surface of the recording head 306, thereby covering an ink discharge port; and a wiper 317 for sweeping and cleaning the ink, dust, and the like deposited near the ink discharge port. A suction pump 323 is further provided for the recovery mechanism portion 312. The suction pump 323 is connected to the cap 313 and sucks a bubble and thickened ink together with the ink from the discharge port by setting the inside pressure of the cap 313 to a negative pressure. The suction pump is also used to suck the ink which has previously been discharged into the open cap.

In FIG. 1, the reading unit 2 is openably and closably attached to the recording unit 3. By opening the reading unit as illustrated in the diagram, the user can access the inside of the recording unit 3. That is, when the reading unit 2 is opened, the apparatus detects it and the carriage 308 is moved to a center portion. Thus, the user can exchange the ink tank 307 on the carriage 308 or execute another desired maintenance operation.

In FIG. 1, the middle frame 81 is provided in the area of the recording unit 3 in the image reading and recording apparatus. A damper unit 7 is coupled between the middle frame 81 and a bottom portion of the reading unit 2. The damper unit 7 is constructed by: a damper base 71 and a damper arm 72 which are mutually fitted so as to be slidable in the axial direction; and a compression spring 73 (FIG. 13) attached in them in a compressed state. An upper edge portion of the damper arm 72 is coupled with the bottom portion of the reading unit 2 through an axial portion 72*a*. A lower edge portion of the damper base 71 is coupled with the middle frame 81 through a rotatable axial portion (not shown). By the built-in compression spring 73, the damper unit 7 generates a force adapted to push the reading unit 2 upward. That is, the damper unit 7 constructs an opening/closing force reducing unit for reducing a lift-up force of the reading unit 2.

When the reading unit 2 is opened, a reading unit opening detection signal is transmitted from an opening detecting unit (not shown) to a CPU. By driving the carriage motor based on the detection signal, the carriage 308 is moved to an ink tank exchange position in the center portion of the recording unit 3. FIGS. 1 and 4 illustrate the state where the carriage 308 is located at the ink tank exchange position. In this state, the ink tank can be exchanged. In the embodiment, therefore, as will be described hereinbelow, the apparatus has a restricting unit 27 which can restrict the reading unit 2 to the closed state. The restricting unit 27 is made inoperative in the state where the pressure plate portion 6 is closed. The restricting unit 27 is made operative in the state where the pressure plate portion 6 is open. By using such a construction, the operation of the opening/closing force reducing unit such as a damper unit 7 or the like for reducing the opening/closing force of the reading unit 2 is added to the interlocking motion which is caused by the opening force when the pressure plate portion 6 is opened, thereby preventing the reading unit 2 from being carelessly opened.

Figure 9A:
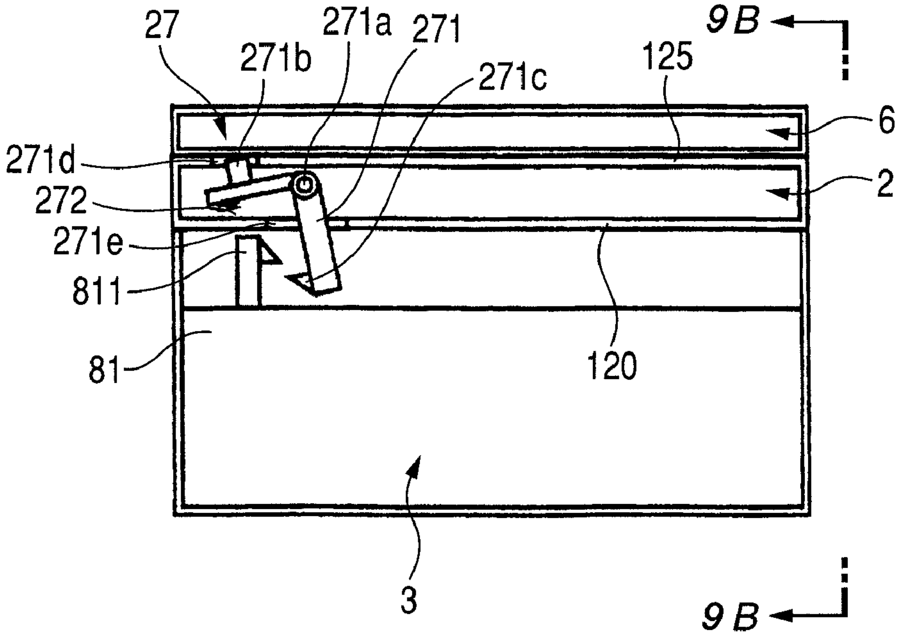
FIGS. 9A and 9B are diagrams illustrating a state where the reading unit of the image reading and recording apparatus according to the first embodiment of the invention is closed.
Figure 9B:
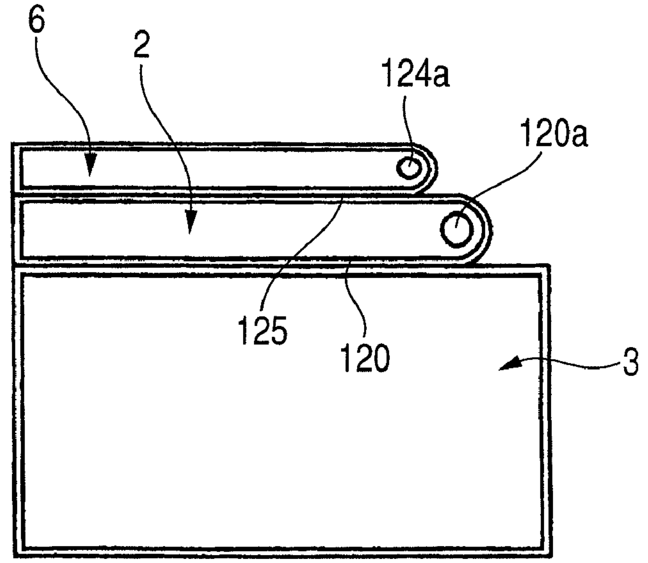
Figure 10A:
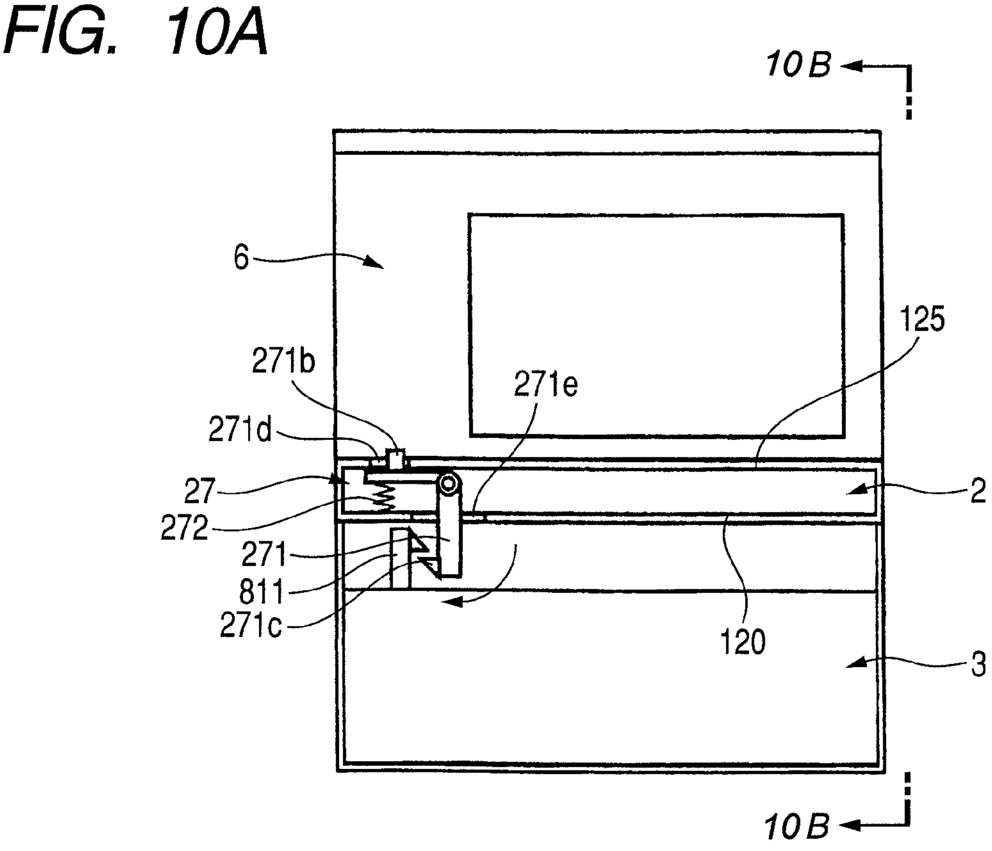
FIGS. 10A and 10B are diagrams illustrating a state where the pressure plate portion is opened.
Figure 10B:
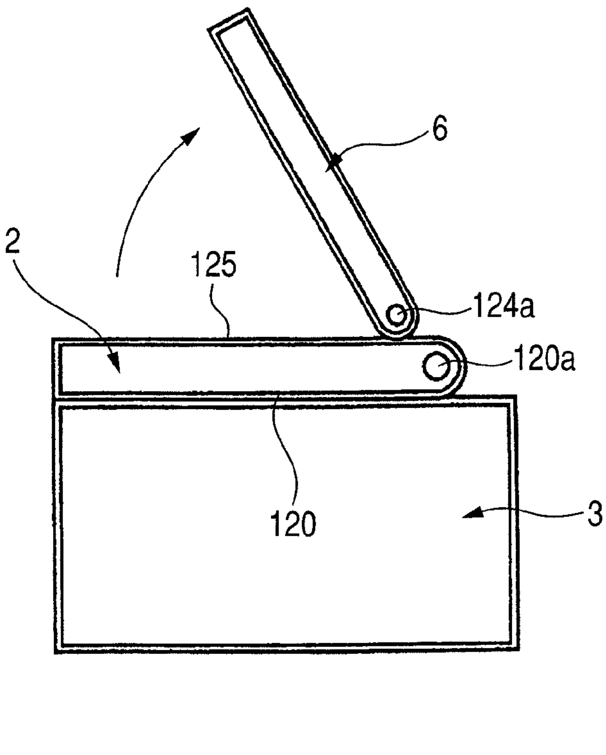

FIGS. 9A and 9B illustrate the state where the reading unit of the image reading and recording apparatus according to the first embodiment of the invention is closed. FIG. 9A is a schematic front cross sectional view. FIG. 9B is a schematic side sectional view taken along the line 9B-9B in FIG. 9A. FIGS. 10A and 10B illustrate the state where the pressure plate portion is open. FIG. 10A is a schematic front cross sectional view. FIG. 10B is a schematic side sectional view taken along the line 10B-10B 10B in FIG. 10A. The restricting unit for restricting (locking) the reading unit 2 to the closed state will now be described with reference to FIGS. 9A to 10B. The restricting unit 27 for restricting the reading unit 2 to the closed state has a restricting lever 271 and a fixing hook 811. The restricting lever 271 is arranged on the left front side of the image reading and recording apparatus. The restricting lever 271 is rotatably axially supported to the frame 120 of the reading unit 2 through an axis 271*a* of its intermediate portion of the lever.

The restricting lever 271 has an almost L-character shape. A projecting portion 271*b* is formed in one arm portion of the lever. When the restricting lever 271 is urged clockwise in the diagram by a spring 272, the projecting portion 271*b* can be projected upward through an opening 271*d* formed in the cover 125 of the reading unit 2. The other arm portion of the restricting lever 271 is projected toward the middle frame 81 of the recording unit 3 through an opening 271*e* of the reading unit 2. A claw portion 271*c* which can be come into engagement with the fixing hook 811 fixed to the middle frame 81 is provided at a tip of the arm portion. Further, the restricting lever 271 is urged clockwise in the diagram by the spring (compression coil spring in the example illustrated in the diagram) 272 around the axis 271*a* as a center. Therefore, in the state where the pressure plate portion 6 is closed, the projecting portion 271*b* of the restricting lever 271 is abutted with a bottom surface (bottom portion) of the pressure plate portion 6 through the opening 271*d* formed in the cover 125 by the spring 272. The state where the projecting portion 271*b* is projected from the cover 125 of the reading unit 2 is also illustrated in FIG. 3.

In the state where the pressure plate portion 6 is closed illustrated in FIGS. 9A and 9B, the projecting portion 271*b* provided for the restricting lever 271 is pushed down by the bottom portion (bottom surface) of the pressure plate portion 6, and the lever 271 is rotated and deviated counterclockwise in the diagram against the spring 272. Therefore, the claw portion 271*c* of the lever 271 is away from the fixing hook 811 provided for the middle frame 81 of the recording unit 3 and is in the state where it is not hooked to the fixing hook 811. In such a state of FIGS. 9A and 9B, the reading unit 2 can be opened (rotated) around a rotational center 120*a* as a center for the recording unit 3.

In the state where the pressure plate portion 6 is opened as illustrated in FIGS. 10A and 10B, the restricting lever 271 is rotated around the axis 271*a* as a center by an urging force of the spring 272. The projecting portion 271*b* is projected upward from the opening 271*d* of the cover 125 of the reading unit 2. When the lever 271 is rotated to such a position, the apparatus enters a state (clamped state) where the claw portion 271*c* provided for the lever has been hooked with the fixing hook 811. Thus, the reading unit 2 enters a state where it cannot be rotated around the rotational center 120*a* as a center. That is, when the pressure plate portion 6 is opened, the reading unit 2 is restricted (locked) to the closed position and enters a restricting state where it cannot be opened.

Although the restricting unit in the embodiment has such a construction that the restricting lever 271 as a movable side is provided on the reading unit 2 side, it is also possible to use a construction in which the restricting lever as a movable side is contrarily provided on the apparatus main body side (the middle frame 81 side of the recording unit).

The embodiment described above relates to the image reading and recording apparatus comprising: the reading unit 2 openably and closably attached to the recording unit 3; and the pressure plate portion 6 openably and closably attached to the reading unit 2 in order to press the original onto the original plate 23 of the reading unit 2. According to the embodiment, the restricting unit 27 (comprising the lever 271, fixing hook 811, spring 272, and the like) which can restrict the reading unit 2 to the closed state is provided. The apparatus is constructed in such a manner that restricting unit is made inoperative in the state where the pressure plate portion 6 is closed (FIGS. 9A and 9B) and restricting unit is made operative in the state where the pressure plate portion is open (FIGS. 10A and 10B). According to such a construction, even in the case where the operation of the reducing unit such as a damper unit 7 or the like for reducing the opening/closing force of the reading unit 2 is added to the interlocking motion which is caused by the opening force when the pressure plate portion 6 is opened, it is possible to prevent the reading unit from being carelessly opened. It is also possible to prevent such a situation that since the reading unit 2 is opened, the carriage 308 on which the recording head 306 of the recording unit 3 and the ink tank 307 have been mounted is unexpectedly moved to the exchange position.

Second Embodiment

Figure 11A:
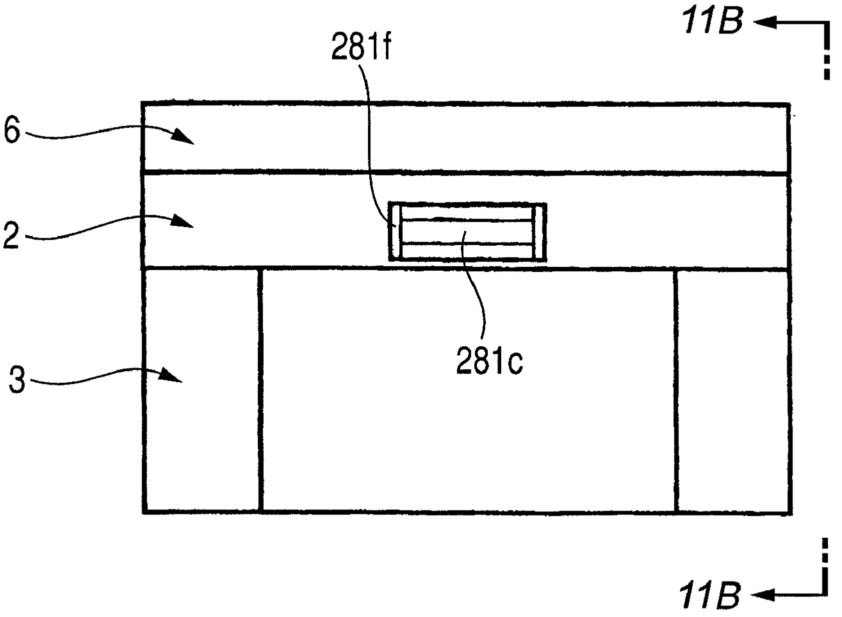
FIGS. 11A and 11B are diagrams illustrating a state where a reading unit of an image reading and recording apparatus according to the second embodiment of the invention is closed.
Figure 11B:
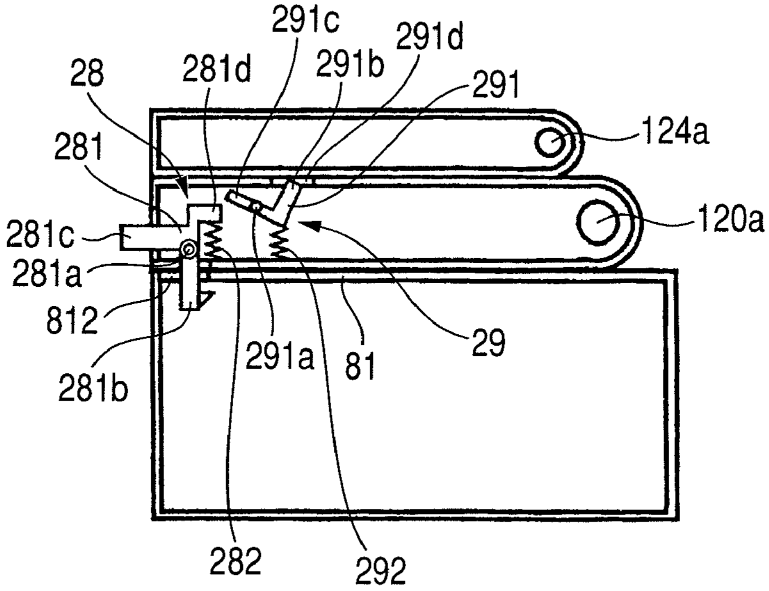
Figure 12A:
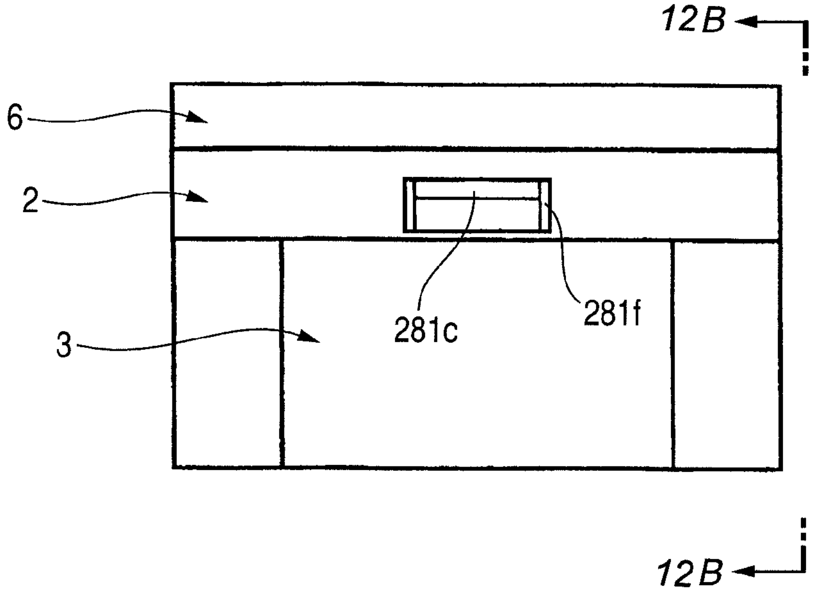
FIGS. 12A and 12B are diagrams illustrating a state where an engaging lever is set to an unlocking position in the state where the reading unit has been closed.
Figure 12B:
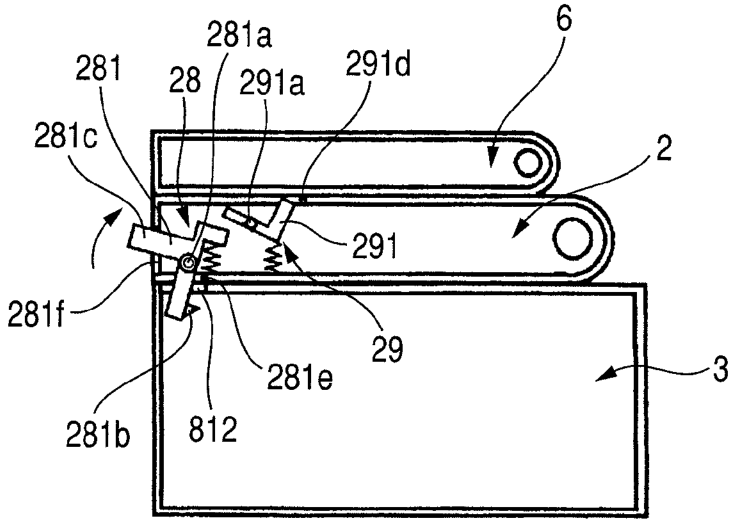
Figure 13A:
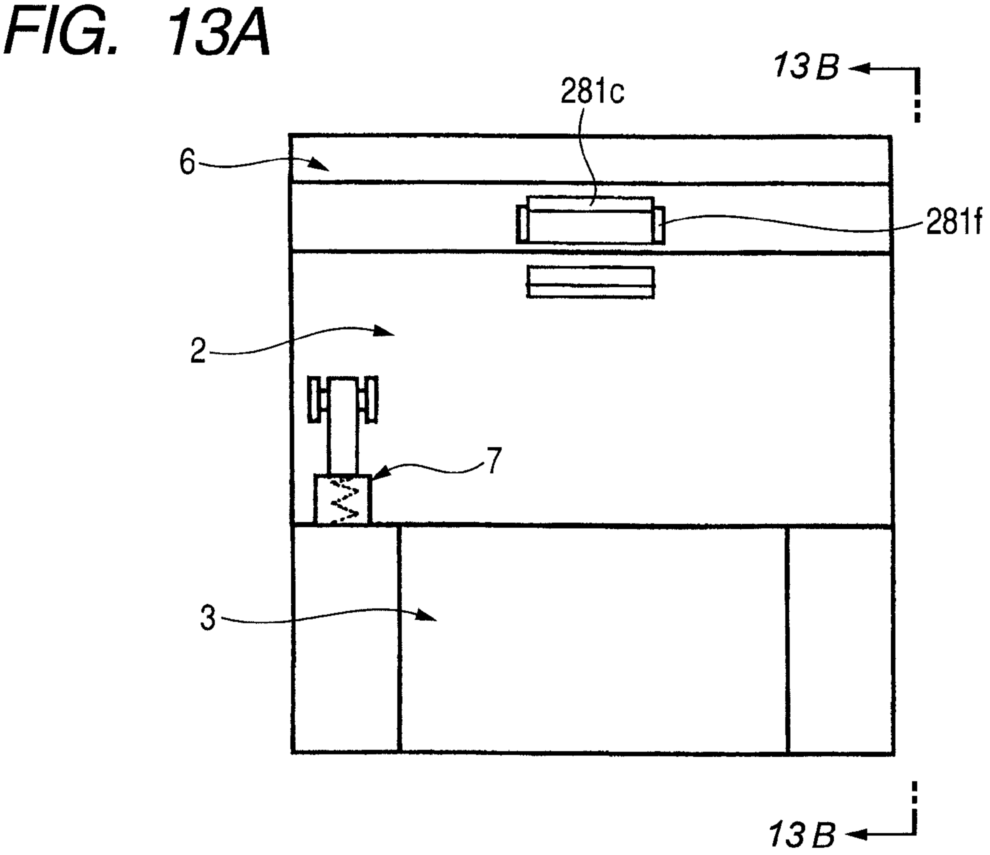
FIGS. 13A and 13B are diagrams illustrating a state where the reading unit is opened in the state where the pressure plate portion has been closed.
Figure 13B:
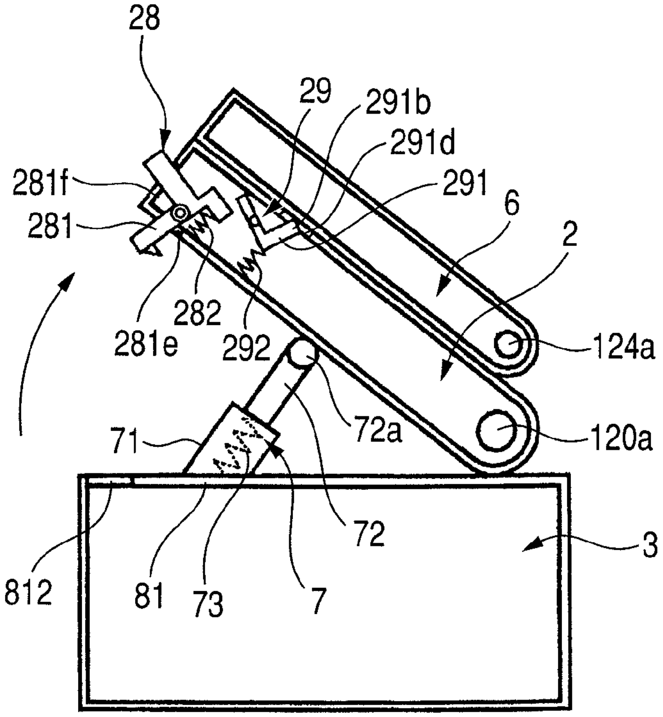
Figure 14A:
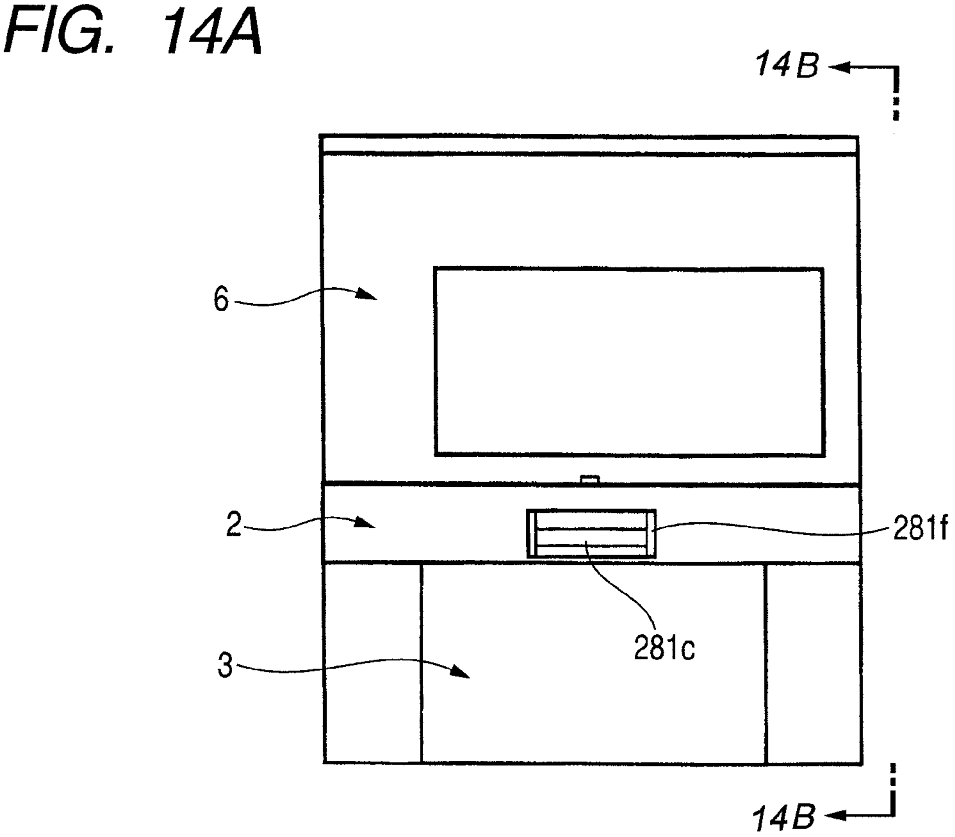
FIGS. 14A and 14B are diagrams illustrating a state where the pressure plate portion is opened in the state where the reading unit has been closed.
Figure 14B:
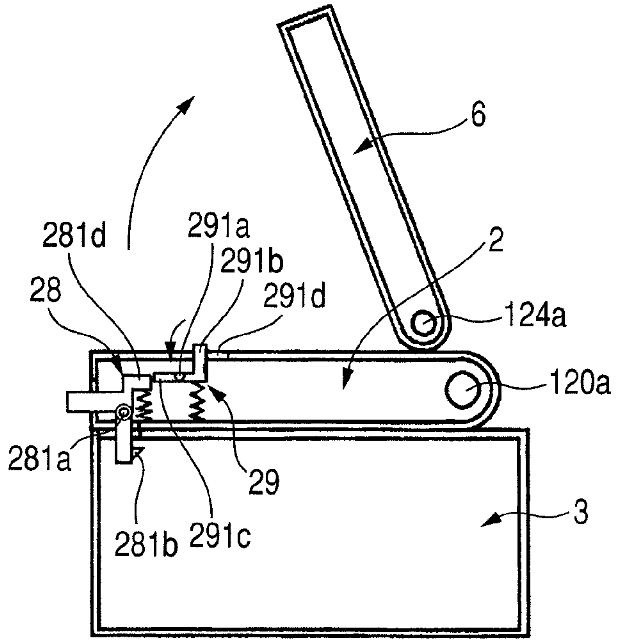
Figure 15:
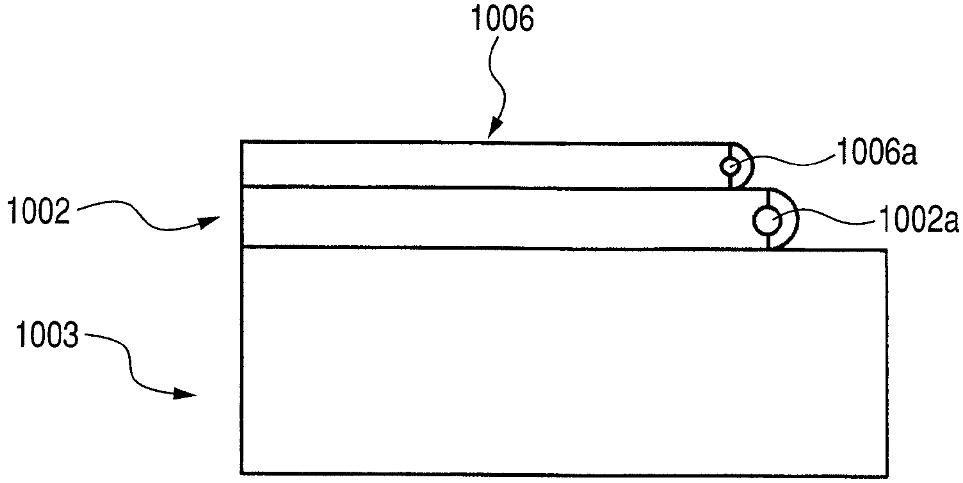
FIG. 15 is a side view illustrating a state where a reading unit of a conventional image reading and recording apparatus is closed.
Figure 16:
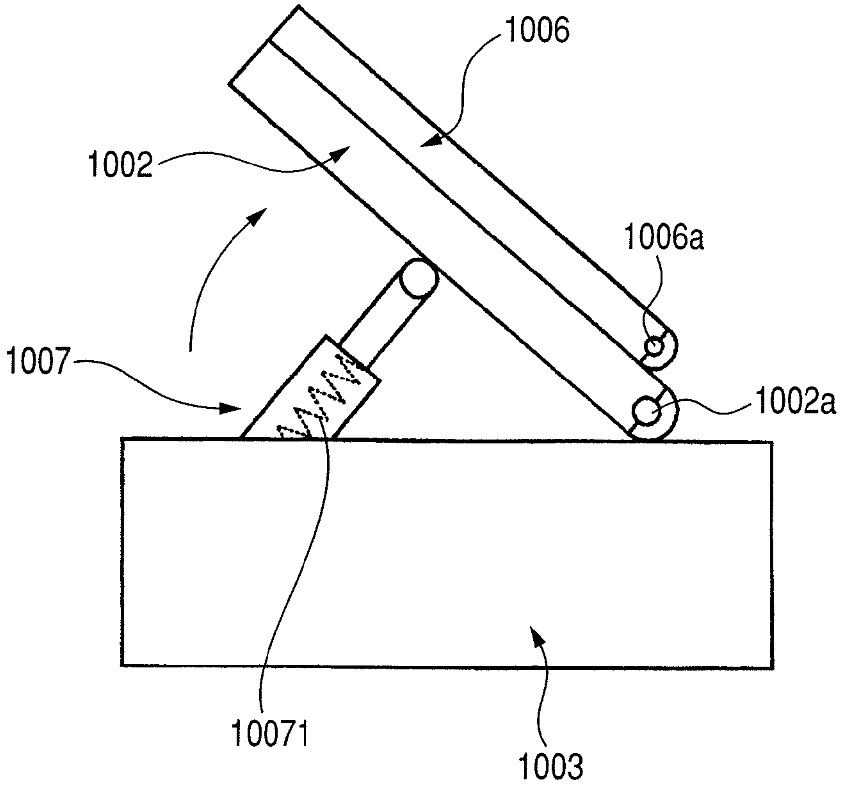
FIG. 16 is a side view illustrating a state where the reading unit is opened.
Figure 17:
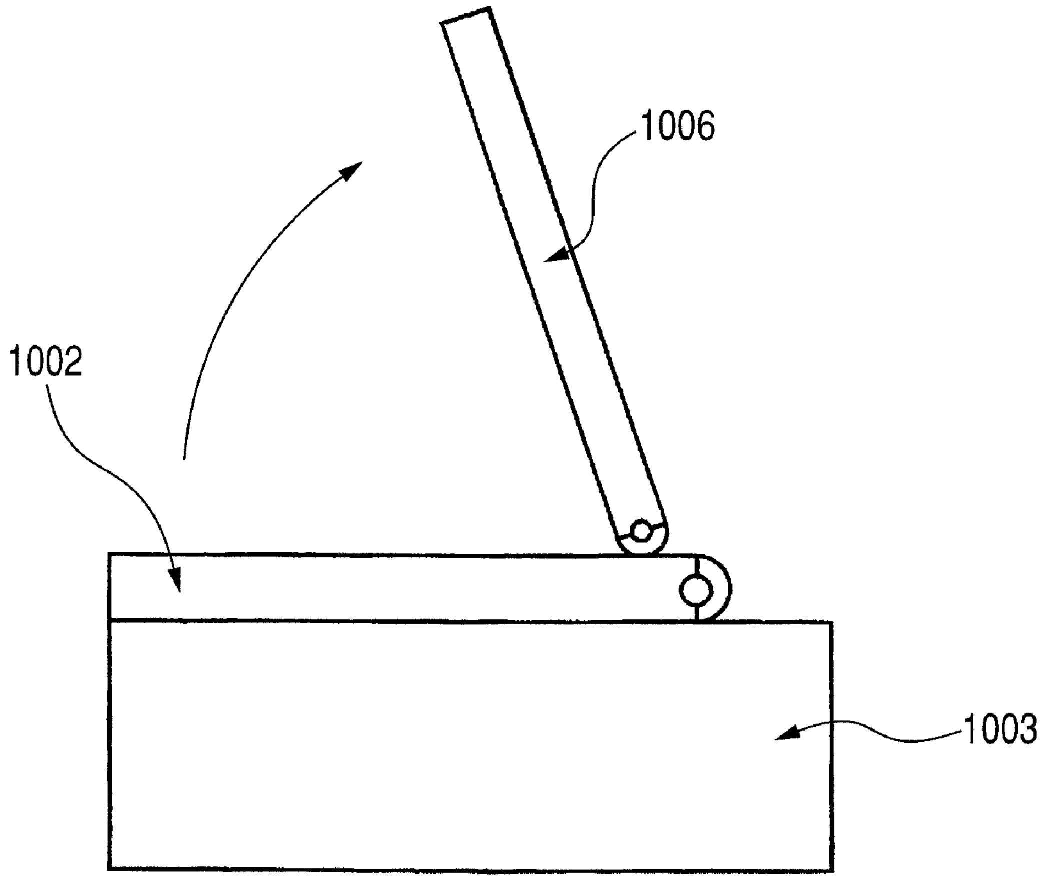
FIG. 17 is a side view illustrating a state where a pressure plate portion is opened.
Figure 18:
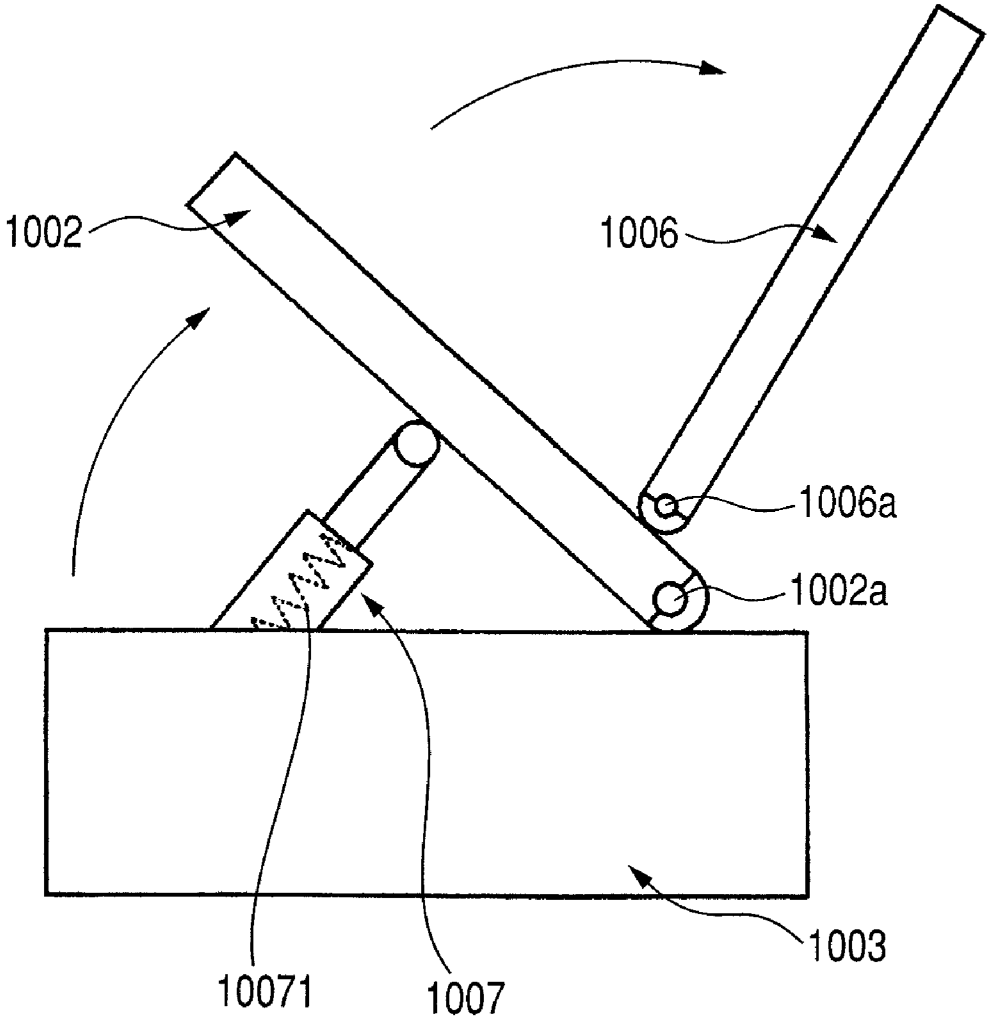
FIG. 18 is a side view illustrating a state where the reading unit and the pressure plate portion are opened.

FIGS. 11A and 11B illustrate a state where a reading unit of an image reading and recording apparatus according to the second embodiment of the invention is closed. FIG. 11A is a schematic front cross sectional view. FIG. 11B is a schematic side sectional view taken along the line 11B-11B in FIG. 11A. FIGS. 12A and 12B illustrate a state where an engaging lever is set to an unlocking position in the state where the reading unit has been closed. FIG. 12A is a schematic front cross sectional view. FIG. 12B is a schematic side sectional view taken along the line 12B-21B in FIG. 12A. FIGS. 13A and 13B illustrate a state where the reading unit is opened in the state where the pressure plate portion has been closed. FIG. 13A is a schematic front cross sectional view. FIG. 13B is a schematic side sectional view taken along the line 13B-13B in FIG. 13A. FIGS. 14A and 14B illustrate a state where the pressure plate portion is opened in the state where the reading unit has been closed in the image reading and recording apparatus of FIGS. 11A and 11B. FIG. 14A is a schematic front cross sectional view. FIG. 14B is a schematic side sectional view taken along the line 14B-14B in FIG. 14A.

An engaging unit and a restricting unit for locking the reading unit 2 in the image reading and recording apparatus according to the second embodiment to the closed state will now be described with reference to FIGS. 11A to 14B. In the second embodiment, the unit for restricting the reading unit 2 to the closed state is constructed by: an engaging unit 28 also serving as an unlocking unit; and a restricting unit 29 for lock cancellation restriction for restricting the engaging unit 28 to the locking position. The engaging unit 28 and the restricting unit 29 are arranged on the opposite side of the rotational center 120*a* of the reading unit 2 (front side of the image reading and recording apparatus in the example illustrated in the diagram).

The engaging unit 28 has an engaging lever 281 also serving as an unlocking lever. The engaging lever 281 is rotatably axially supported to the frame 120 of the reading unit 2 through an axis 281*a* of its intermediate portion. A claw portion 281*b*, an operation lever portion 281*c*, and an abutting portion 281*d* are provided for the engaging lever 281. The engaging lever 281 is urged counterclockwise in the diagram by an engaging spring (compression coil spring in the example illustrated in the diagram) 282. The operation lever portion 281*c* is projected from the front surface of the reading unit 2 through an opening 281*f* and can be operated by the user from the outside. The claw portion 281*b* is extended downward through an opening 281*e* formed in the frame 120 and an opening 812 formed in the middle frame 81. The claw portion 281*b* is arranged in such a manner that it is come into engagement (or retained) from the recording unit 3, thereby enabling the reading unit 2 to be locked at the closed position.

The restricting unit 29 has a restricting lever 291 for lock cancellation restriction. The restricting lever 291 is rotatably axially supported to the frame 120 of the reading unit 2 through an axis 291*a* of its intermediate portion. An abutting portion 291*b* and a restricting portion 291*c* are provided for the restricting lever 291. The restricting lever 291 is urged counterclockwise in the diagram by a restricting spring (compression coil spring in the example illustrated in the diagram) 292. The abutting portion 291*b* can be projected upward through an opening 291*d* formed in the cover 125 of the reading unit 2. When the pressure plate portion 6 is closed, the abutting portion 291*b* abuts with the bottom portion (bottom surface) of the pressure plate portion 6 by an urging force of the restricting spring 292. A state where the abutting portion 291*b* is projected from the cover 125 of the reading unit 2 is illustrated in FIGS. 14A and 14B. With respect to other points, the image reading and recording apparatus according to the second embodiment of the invention of FIGS. 11A to 14B has substantially the same construction as that in the case of the foregoing first embodiment.

In the state where both of the reading unit 2 and the pressure plate portion 6 in FIGS. 11A and 11B are closed, the restricting portion (for lock cancellation restriction) 291*c* of the restricting lever 291 exists at a position out of a rotational locus of the abutting portion 281*d* of the engaging lever 281 also serving as an unlocking lever. Therefore, the engaging lever 281 can be rotated irrespective of the restricting lever 291. Therefore, in the case of opening the reading unit 2, as illustrated in FIGS. 12A and 12B, the operation lever portion 281*c* of the engaging lever 281 is rotated in the direction shown by an arrow. As illustrated in FIGS. 13A and 13B, by lifting up the reading unit 2, the reading unit can be opened. That is, it is sufficient to rotate the reading unit 2 upward around the rotational center 120*a* of the frame 120 as a center together with the lever operation in the arrow direction in FIG. 12B. Thus, the reading unit 2 can be opened as illustrated in FIGS. 13A and 13B without hooking the claw portion 281*b* with edges of the openings 812 and 281*e*.

On the other hand, when only the pressure plate portion 6 is opened from the state of FIGS. 11A and 11B where both of the reading unit 2 and the pressure plate portion 6 are closed, as illustrated in FIGS. 14A and 14B, by restricting the engaging unit 28 to the restricting (hooked) position by the restricting unit 29, the reading unit 2 can be restricted to the closed state. That is, when the pressure plate portion 6 is rotated around a rotational center 124*a* as a center and opened, the restricting lever 291 is rotated counterclockwise in the diagram around the axis 291*a* as a center by the urging force of the restricting spring 292. That is, since the pressure plate portion 6 to which the abutting portion 291*b* has been pressed ascends, the abutting portion 291*b* is moved further upward through the opening 291*d* in the cover 125 by the operation of the spring 292. Thus, the restricting lever 291 is rotated counterclockwise in the diagram and the restricting portion 291*c* of the restricting lever 291 is moved to a position adapted to close the rotational locus (position adapted to inhibit the rotation) of the abutting portion 281*d* of the engaging lever 281 as illustrated in FIG. 14B.

Therefore, the engaging lever 281 cannot be rotated clockwise in the diagram from the position in FIGS. 14A and 14B irrespective of the urging force of the engaging spring 282. That is, even by the operation of the operation lever portion 281*c* as shown by an arrow in FIG. 13B, the engaging lever 281 cannot be rotated from the position in FIGS. 11A and 11B. Therefore, since the apparatus enters a state where the hooking state of the claw portion 281*b* of the engaging lever 281 and the edge of the opening 812 of the middle frame 81 cannot be cancelled, the reading unit 2 cannot be opened. As mentioned above, also in the embodiment, even in the case of providing the reducing unit such as a damper unit 7 for reducing the opening force of the reading unit 2, when the pressure plate portion 6 is opened, it is possible to prevent the reading unit 2 from being opened by the interlocking motion caused by its opening force.

The second embodiment described above also relates to the image reading and recording apparatus comprising: the reading unit 2 openably and closably attached to the recording unit 3; and the pressure plate portion 6 openably and closably attached to the reading unit 2 in order to press the original onto the original plate 23 of the reading unit 2. According to the embodiment, therefore, the apparatus has: the engaging unit 28 which can be come into engagement with the recording unit 3 in the state where the reading unit 2 is closed; and the restricting unit 29 which can restrict the engaging unit 28 to the position where it is come into engagement with the recording unit 3. The apparatus is constructed in such a manner that the engaging unit 28 is restricted by the restricting unit 29 into the state where it is come into engagement with the recording unit 3 in the state where the pressure plate portion 6 is opened. With such a construction as well, even in the case where the operation of the reducing unit such as a damper unit 7 or the like for reducing the opening/closing force of the reading unit 2 is added to the interlocking motion which is caused by the opening force when the pressure plate portion 6 is opened, it is possible to prevent the reading unit from being carelessly opened. It is also possible to prevent such a situation that since the reading unit 2 is opened, the carriage 308 on which the recording head 306 of the recording unit 3 and the ink tank 307 have been mounted is unexpectedly moved to the exchange position.

Although the lever system using the engaging lever 281 also serving as an unlocking lever has been used as an engaging unit 28 also serving as an unlocking unit in the second embodiment, such a structure can be also realized by a push button system. Although the engaging lever 281 has been provided for the reading unit 2 in the embodiment, the engaging lever 281 may be arranged on the recording unit 3 side.

A recording unit in the foregoing embodiment is not limited to a recording system such as ink-jet system, laser-beam system, a thermal-transfer system, a thermal-sensitive system, a wire-dot system, or the like but a recording apparatus of any one of those recording systems can be used.

According to each of the foregoing embodiments of the invention, there is provided the image reading and recording apparatus in which even in the case where the operation of the reducing unit such as a damper unit or the like for reducing the opening/closing force of the reading unit is added to the interlocking motion which is caused by the force adapted to open the pressure plate portion, it is possible to prevent the reading unit from being carelessly opened for the recording unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-226120, filed Aug. 23, 2006, which is hereby incorporated by reference herein in its entirety.

What is claimed is:

1. An image reading and recording apparatus comprising:

a recording unit which records an image onto a recording medium;

a reading unit which is openably and closably arranged for the recording unit and which has an original plate on which an original is put and an openable/closable pressure plate portion which presses the original onto the original plate; and a restricting unit which restricts the reading unit from being opened from the recording unit when the pressure plate portion is opened, and which releases the restriction by an action of closing the pressure plate portion;

wherein the restricting unit includes:

a rotatable restricting lever having a claw portion;

a fixing hook which can be engaged with the claw portion; and wherein the rotatable restricting lever further has a projecting portion, and wherein when the pressure plate portion is opened, the projecting portion of the restricting lever is projected through the original plate and the claw portion engages the fixing hook, while when the pressure plate portion is closed, the projecting portion of the restricting lever is suppressed by the pressure plate portion to release the engagement of the claw portion with the fixing hook.

2. An apparatus according to claim 1, wherein a damper for reducing an opening/closing force of the reading unit is provided between the recording unit and the reading unit.

3. An apparatus according to claim 1, wherein the recording unit records the image onto the recording medium by discharging ink from a recording head.

* * * * *